INVENTOR
Robert P. Chura

April 19, 1966  R. P. CHURA  3,246,910

VEHICLE SUSPENSION SYSTEM

Filed Dec. 6, 1963  3 Sheets-Sheet 3

INVENTOR
Robert P. Chura

BY Clive H. Bramson

ATTORNEY

United States Patent Office 3,246,910
Patented Apr. 19, 1966

3,246,910
VEHICLE SUSPENSION SYSTEM
Robert P. Chura, Amityville, N.Y.
(18 Stanwich Road, Smithtown, N.Y.)
Filed Dec. 6, 1963, Ser. No. 328,674
6 Claims. (Cl. 280—104)

This invention relates to vehicular wheel suspension systems and more specifically to novel suspension means capable of assuring maximum concurrent contiguity between the wheels of a multi-wheeled vehicle and the surface over which the vehicle is moving, notwithstanding extreme variations and irregularities with respect to the topographical configurations of the surface.

As is well known, heavy vehicular loads are preferably carried upon a rolling support system comprising linearly arranged pairs of wheels positioned beneath respective sides of the load-carrying chassis, such an arrangement being desirable to the end of effectuating required distribution of the load over a broad support area and to further enhance the stability of the load. Where the traversed surface includes soft and yielding terrain, such as sand, snow or the like, the utilization of series of paired wheel units has been determined preferable and often indispensable to obviate the sinking tendency of the vehicle resulting in restraint of motion.

Where the surface topography is, however, rutted, sharply sloped, mogulled and otherwise irregular, maintenance of simultaneous contact of all the wheels of a multi-wheeled support system with the surface is often difficult, such difficulty being even greater where, as aforementioned, pairs of wheels linearly arranged, are utilized.

Consonant with the foregoing, the present invention is primarily directed to the provision of a vehicle suspension system including a plurality of independently axled pairs of wheels, suspension means being incorporated therewith to preclude interruption of contact of any wheel of the entire plurality and of each wheel of every pair of wheels as well, with respect to the supporting surface, regardless of the irregularity of slope, shape or lack of uniformity of the supporting surface.

Another object of the present invention resides in the provision of a unique suspension system adapted to permit vertical, longitudinal, and pivotal movement of individual, interconnected pairs of wheels supporting a vehicle chassis with respect to said chassis.

A further object of this invention is to provide a novel and improved vehicle suspension system of the aforementioned character which may be utilized effectively in vehicular structures designed for use with external or self-contained propulsion means.

Still another object of the instant invention resides in the provision of unique axle supporting means capable of permitting vertical and angular orientation of the wheels to accommodate the dictates of the terrain thereby maximizing the stability and traction of the vehicle.

Another general object of the present invention is to provide a device of the described character which will be relatively simple in structure, economical of manufacture, widely applicable and highly effective in use.

Other objects and advantages of the instant vehicle suspension system will be set forth in part hereinafter, and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description, serve to explain the principles of the invention.

Figure 1:
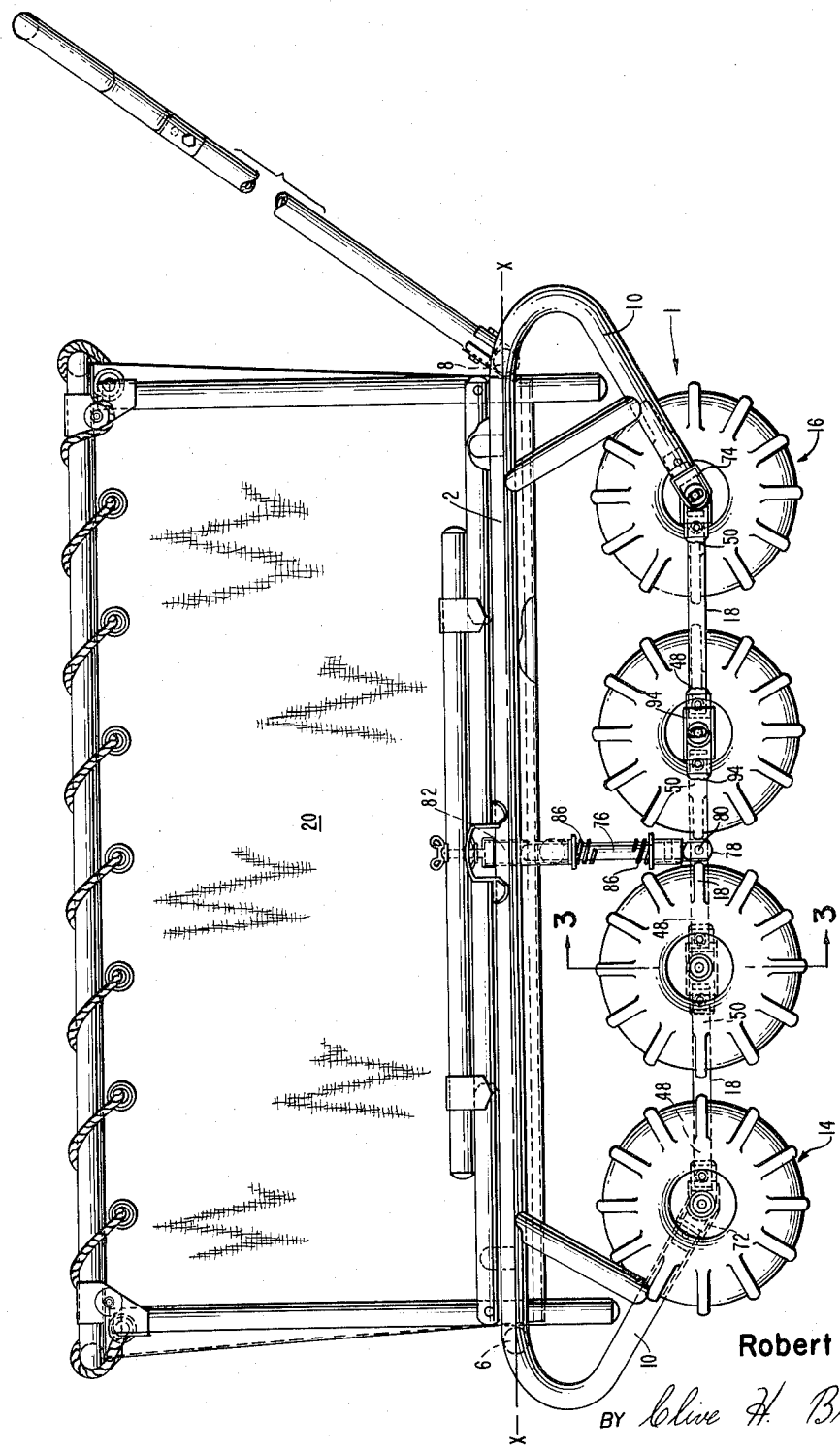
FIGURE 1 is a side elevational view of a push-propelled carriage type vehicle including a suspension system in accordance with the present invention.
Figure 2:
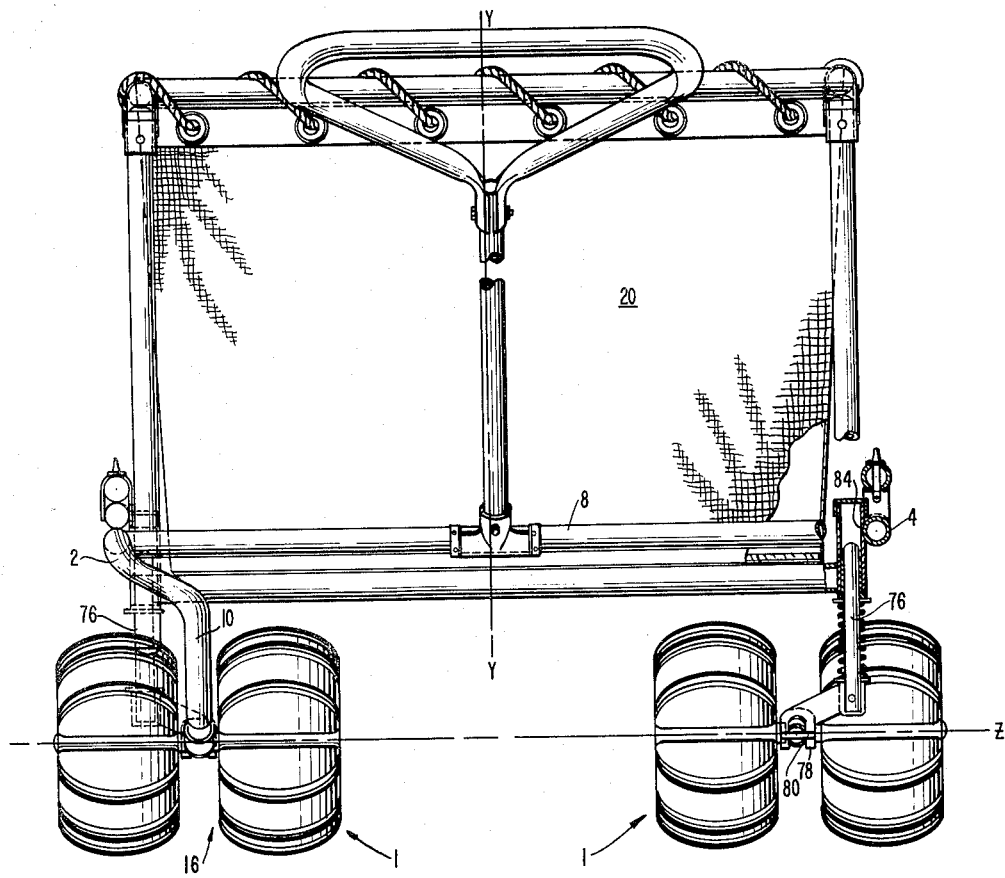
FIGURE 2 is an end elevational view thereof.

Referring now in detail to the present preferred embodiment of the invention illustrated in the accompanying drawings, the suspension generally designated by numeral 1 in FIGURES 1 and 2 is seen essentially comprised of pairs of wheels related in parallelism and linked together in respective side-by-side link-chain linear arrangements, the axles of respective pairs of wheels at either end of respective link-trains being connected to a chassis, compression support members being fixedly depending substantially centrally of each side of the chassis, each compression support member being pivotally connected to a respective link-train intermediate the ends of the latter.

The chassis and vehicle structure herein employed is merely exemplary and explanatory of chassis and vehicle structures to which the instant invention is applicable, it being understood that other shapes and types thereof may be utilized if so desired. The carriage structure 20 shown herein is also exemplary and while the vehicular structure illustrated is in the form of a push- or pull-type cart, the vehicle may equally well be of the self-motivated type of any suitable configuration.

Specifically, the presently preferred chassis is comprised of a pair of downwardly oriented U-shaped tubular frame members 2 and 4 united in spaced parallel relation by transverse tubular members 6 and 8. Said tubular members, as shown in FIGURE 2, are bent inwardly and vertically at the open downwardly facing portions 10 thereof to permit connection of said frame members intermediate the axles of end pairs of wheels 14 and 16 and to further permit linear linking of the respective link-chains by dint of section members 18 extending between the pairs of wheels included within each link-chain.

Figure 3:
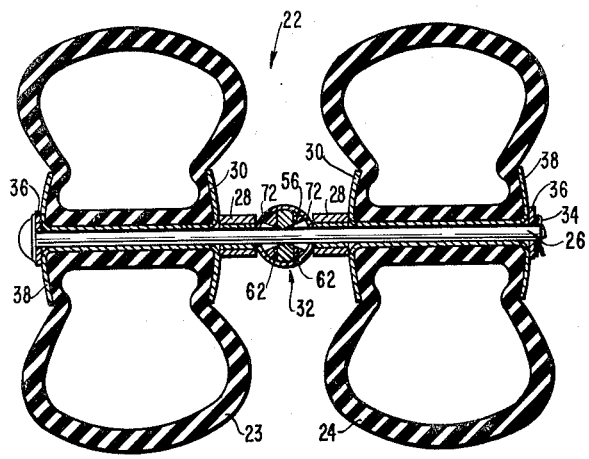
FIGURE 3 is a vertical cross-sectional view of a pair of wheels, their common-axle and a link assembly element associated therewith taken along line 3—3 of FIGURE 1.

As seen in FIGURE 3 of the drawings, a typical pair of wheels 22 included within the suspension system has a common-axle 26, the individual wheels 23, 24 of said pair being rotatably supported thereon. Spacer members 28 are positioned between inside hub-plates 30 of said wheels and link assembly element 32, the latter being described in detail hereinbelow following. Wheels 23 and 24 are retained upon the axle by cotter-pins 34 in the usual manner, and are additionally secured in position by washers 36 seen disposed intermediate said cotter-pins and outside hub-plates 38.

Essentially, the aforementioned link assembly elements 32, components of the suspension means provided at each side of the chassis and connected to the aforedescribed U-shaped tubular frame members thereof, permit independent pivotal movement of each said pair of wheels in a plane normal with respect to longitudinal axis X—X of said chassis, and relative movement of individual pairs of wheels in directions parallel with respect to vertical axis Y—Y of said chassis. Coaction of said section members 18 with said link assembly elements further permits independent relative movement of individual pairs of wheels in directions parallel with respect to said longitudinal axis X—X.

Figure 7:
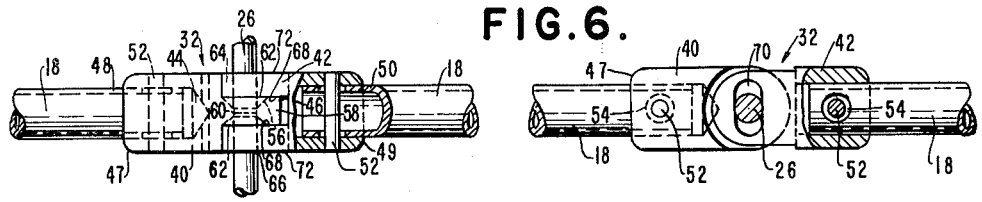
FIGURE 7 is a fragmentary, partially cross-sectional, plan view of a link assembly element, a common-axle and section members arranged in operative coacting relation.
Figure 8:
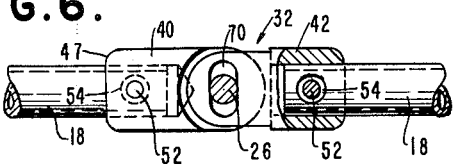
FIGURE 8 is a side elevational view thereof.
Figure 9:
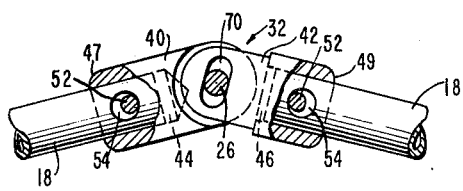
FIGURE 9 is a showing of the pivotal relation of the forward and rearward portions of the link assembly element.

To facilitate comprehension of the mode of operation of said link assembly elements 32, reference is now directed to FIGURES 7–9 of the drawings wherein the construction and cooperation of the parts of the assembly together with the association of respective section members therewith is disclosed. Accordingly, the typical link assembly element 32 shown in said illustrations is seen comprised of forward and rearward portions 40 and 42, respectively, bores 44 and 46 being disposed axially at ends 47, 49 of each respective portion. The opposing ends 48 and 50 of section members 18 are slidably receivable within said bores 44 and 46, respectively, to thus provide the aforesaid link-train as shown in FIGURE 1. Securing-pins 52 disposed transversely of said bores, and fixedly related therewith as shown, retain said section members within said bores, axial movement of the former within the latter, however, being permitted in view of the larger diameter of securing-pin-receiving passages 54 disposed transversely through ends 48 and 50 of said section members with respect to the diameter of said securing-pins. Accordingly, the foregoing structure in addition to establishing connection between said section members and link assembly elements, further permits independent relative movement of said section members, link assembly elements and hence said pairs of wheels supported by the suspension means in a manner to be disclosed in greater detail, said relative movement being parallel with respect to a plane passing vertically through said longitudinal axis X—X.

With continued reference to said FIGURE 7 and additionally now to FIGURE 3, axle-passage 56 will be observed disposed transversely through tongue 58 at the other end of said forward portion 40, said axle-passage being circular at the central portion 60 thereof and conically diverging coaxially with respect to and from said circular central portion to extend through said tongue to each flat side wall 62, the latter forming the parallel external side surfaces of said tongue. As shown, said rearward portion 42 includes a bifurcated end having spaced parallel ears 64 and 66, said ears being adapted to straddle the tongue 58 as shown, the inwardly facing flat surfaces 68 of the ears being slidingly contiguous with said flat side walls 62 of the tongue. Each ear, as shown in the drawings, is provided with a vertical slot 70 therethrough, said slots being divergingly tapered outwardly from respective flat surfaces 68 to respective outwardly facing surfaces 72, said outwardly facing surfaces being arcuate in view of the circular cross-section of said link assembly element as seen particularly in FIGURE 3. The vertical dimensions of said slots at the flat surfaces 68 of said ears is, as observed in FIGURE 3, substantially equal to the largest dimension of said axle-passage 56 at the flat side walls 62 of said tongue, the largest dimension of said divergingly tapered slots being at said outwardly facing surfaces 72 of said ears.

Figure 6:
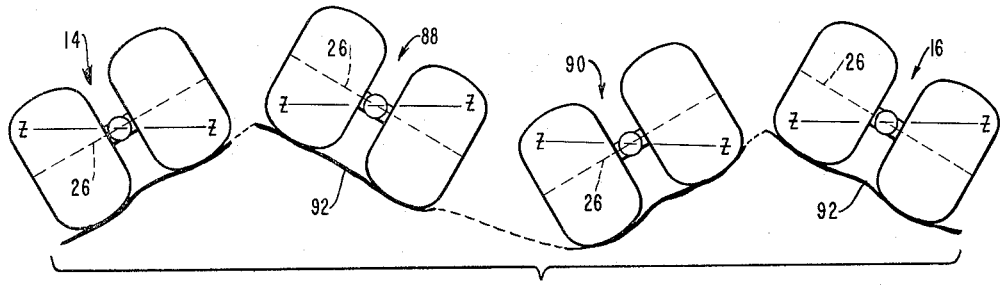
FIGURE 6 is an exemplary illustration of the independent pivotal capabilities of each of the pair of wheels shown in FIGURES 4 and 5, the attitudes thereof being in accommodation of the irregular terrain in a direction lateral to their forward direction.

Therefore, an individual common-axle 26 received through the axle-passage 56 and vertical slots 70 of each respective link assembly element as aforedescribed, will establish a pivotal connection between the forward and rearward portions thereof as seen in FIGURE 9, each combined common-axle and pair of wheels rotatable thereupon being pivotally movable about the said circular central portion 60 of the respective link assembly element in planes normal with respect to longitudinal axis X—X of said chassis. That is, pivotal movement of common-axles 26 will be permitted in the planes passing vertically through respective transverse axes Z—Z as shown in FIGURE 6, such pivotal movement being limited by the largest vertical dimension of said slots 70. Inasmuch as the slot within each ear is identical and corresponding slots are in mutual mirror image alignment as shown, maximum pivotal rotation in either vertical direction will also be equal. By reason of the vertical orientation of the slots, movement of said axles in planes other than the vertical will be precluded.

Figure 4:
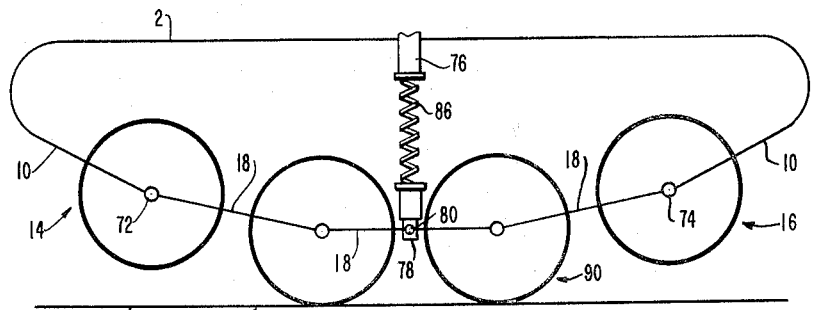
FIGURE 4 is a side elevational skeletal view of the chassis and suspension system under non-loaded conditions.
Figure 5:
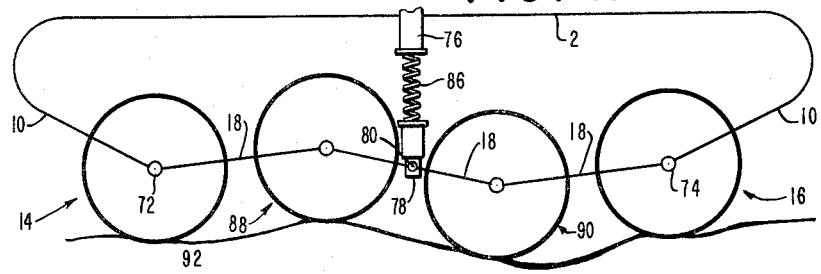
FIGURE 5 is a view of the vehicle of FIGURE 4 under loaded conditions, the wheels thereof being supported upon an irregular surface.

The aforedescribed link-chain portion of the suspension means comprised of section members 18 interconnected to link assembly elements 32, is suspendedly connected to frame members 2 and 4 of said chassis as shown in FIGURES 1, 4, and 5, whereby terminal link assembly elements 72, 74 are secured by one pivotal portion thereof to respective ends of downwardly facing portions 10 of said frame members. The means employed to maintain the respective link-chains and wheels supported thereby in spaced relation with respect to the chassis, consists of compression support members 76, one each thereof being utilized at respective sides of the vehicle. Said compression support members extend downwardly and inwardly of each side of the chassis as shown in FIGURE 2 of the drawings, the lower ends 78 thereof being pivotally connected at 80 to a section member 18, such pivotal connection being provided substantially midway of said terminal link assembly elements 72 and 74. The upper end 82 of each support member is fixedly secured to the chassis at 84 preferably by welding as shown, or by other suitable means. Compression spring 86, normally in the unloaded expanded position as shown in FIGURE 4, will maintain the chassis distant with respect to central wheel pairs 88 and 90, while terminal wheel pairs 14 and 16, which are essential unyieldingly associated with said chassis, will be maintained spacedly with respect to ground surface 92. When the vehicle, however, is subjected to load-carrying conditions, the spring will assume the compressed attitude as shown in FIGURE 5. FIGURES 5 and 6 further indicate the accommodating capabilities of the instant vehicle suspension system to extremely irregular topography, FIGURE 5 being illustrative of the independence of movement afforded to pairs of wheel units in directions parallel with respect to a plane passing vertically through the longitudinal axis X—X; FIGURE 6 being illustrative of the independent pivotal ability of each pair of wheels in planes normal with respect to said longitudinal axis.

To the end of excluding sand or other foreign attritious matter from the movable joints interconnecting the link assembly elements, section members and common-axles, flexible sealing means 94, comprised of a yieldable sheath or an elastomeric coating is utilized, the application of such means being illustrated in FIGURE 1, wherein the seal is shown disposed externally about the link assembly elements and therefrom partially about the ends of respective section members.

Although the preferred embodiment of the vehicle suspension means has been described, it will be understood that within the purview of this invention various changes may be made in the forms, details, proportion and arrangement of parts, the combination thereof and mode of operation, which generally stated consists in a structure capable of carrying out the objects set forth, as disclosed and defined in the appended claims.

What is claimed is:

1. In a vehicle suspension system, the combination comprised of a chassis having transverse, longitudinal and vertical axes, at least two pairs of wheels at each side of the chassis, each pair of wheels having a common-axle, suspension means provided at each side of said chassis, said suspension means including link assembly elements which are formed of forward and rearward portions, said portions being pivotally connected for relative movement about a common-axle, said forward and rearward portions each having a bore disposed axially of one of the ends thereof, and section members connecting said link assembly elements and coacting therewith to permit independent movement of each pair of wheels, respectively, in directions parallel with respect to a plane passing vertically through said longitudinal axis, the ends of said respective section members being slidably received within said bores, respectively, a securing-pin disposed transversely of said bores, the ends of said section members having a securing-pin-receiving-passage disposed transversely therethrough, said passage being substantially larger of diameter than the diameter of said securing-pin, said securing-pin being positioned through said passage to connect said members to said link assembly elements, said link assembly elements supporting pivotal movement of each pair of wheels, respectively, in planes normal with respect to the longitudinal axis of said chassis, a compression support member extending downwardly of each side of said chassis, one end of each compression support member being pivotally connected to a respective section member, the other end of each support member being fixedly connected to said chassis.

2. In a vehicle suspension system as set forth in claim 1, wherein the other end of said forward portion is formed with an axle-passage disposed transversely therethrough, said axle-passage being circular at the central portion thereof and conically diverging coaxially with respect to and from said central circular portion to extend through to the surface of said forward portion, the other end of said rearward portion being bifurcated to provide spaced parallel ears adapted to straddle said other end of the forward portion, each ear having an inwardly facing flat surface on one side and an outwardly facing surface on the other side, said ears being provided with vertical slots therethrough, said slots being divergingly tapered outwardly from respective said flat surfaces to respective outwardly facing surfaces, the vertical dimension of said slots at said flat surfaces being substantially equal to the dimension of said axle-passage at the surface of said forward portion, said common-axle being receivable through said axle-passage and said vertical slots to thereby pivotally connect said foward and rearward portions, said common-axle being pivotally and rotatably supportable within said axle-passage and vertical slots.

3. In a vehicle suspension system as set forth in claim 2 wherein each link-assembly element is provided with flexible sealing means disposed externally thereabout.

4. In a vehicle suspension system as set forth in claim 1, wherein the other end of said forward portion has a tongue formed with an axle-passage disposed transversely therethrough, said axle-passage being circular at the central portion thereof and divergingly tapered from said central circular portion and in opposing directions coaxially therewith, to the surface of said tongue, the other end of said rearward portion being bifurcated to provide spaced parallel ears adapted to straddle said tongue, each ear having an inwardly facing flat surface on one side and an outwardly facing surface on the other side, said ears being provided with vertical slots therethrough, said slots being divergingly tapered outwardly from respective said flat surfaces to respective outwardly facing surfaces, the vertical dimension of said slots at said flat surfaces being substantially equal to the dimension of said axle-passage at the surface of said tongue, said common-axle being receivable through said axle-passage and said vertical slots to thereby pivotally connect said forward and rearward portions, said common-axle pivotally and rotatably supportable within said axle-passage and vertical slots.

5. In a vehicle suspension system as set forth in claim 4, wherein said tongue includes flat parallel side walls, said side walls being contiguously and slidingly receivable intermediate said flat surfaces of the ears.

6. In a vehicle suspension system, the combination comprised of a chassis having transverse and longitudinal axes, a plurality of pairs of wheels at each side of the chassis, a wheel axle supporting each pair of wheels, suspension means provided at each side of said chassis for supporting each pair of wheels so as to permit united vertical movement of each pair of wheels, respectively, with respect to said chassis and united pivotal movement of each pair of wheels, respectively, in a vertical plane normal with respect to the longitudinal axis of said chassis, said suspension means being comprised of at least two section members arranged in spaced end-to-end relation, a first link assembly element disposed intermediate the opposing spaced ends of respective section members, and second and third link assembly elements disposed intermediate the other respective ends of said section members and said chassis, each link assembly element being adapted to support a wheel axle thereon.

References Cited by the Examiner

UNITED STATES PATENTS

| | | | |
|---|---|---|---|
| 838,343 | 12/1906 | Lindecker | 280—104 |
| 2,246,609 | 6/1941 | Townsend | 280—104 X |
| 2,493,023 | 1/1950 | Pointer | 280—104.5 |
| 2,710,198 | 6/1955 | Hall | 280—81.5 |

BENJAMIN HERSH, *Primary Examiner.*

P. GOODMAN, *Assistant Examiner.*